May 2, 1967 G. CAPOWICH ETAL 3,316,975
HELICOPTER BLADE TIP SEAL
Filed Feb. 25, 1965 2 Sheets-Sheet 1
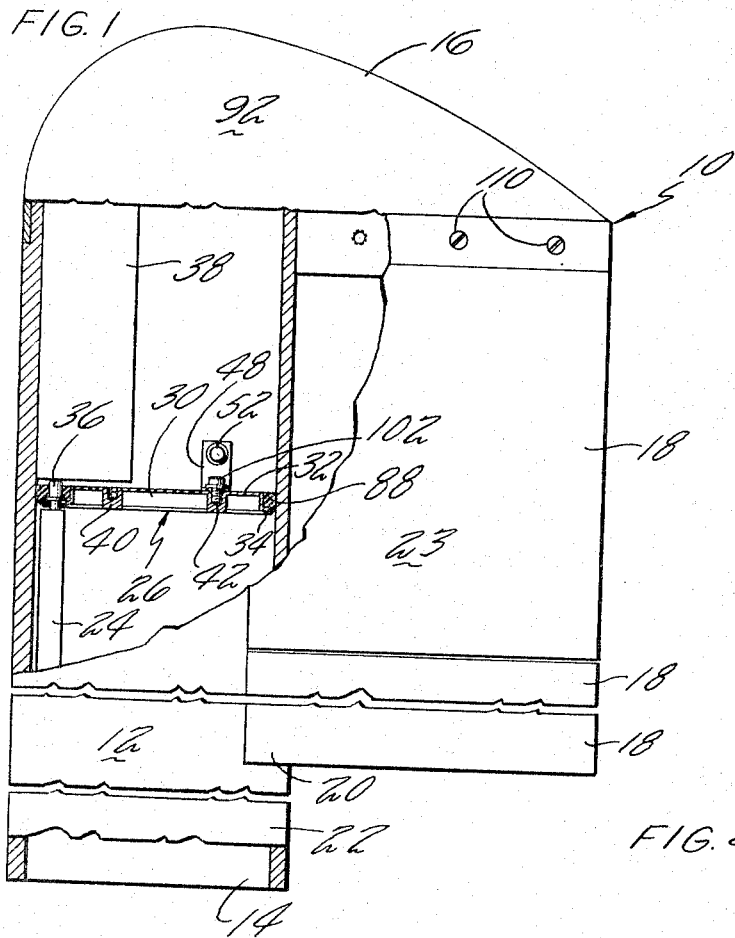
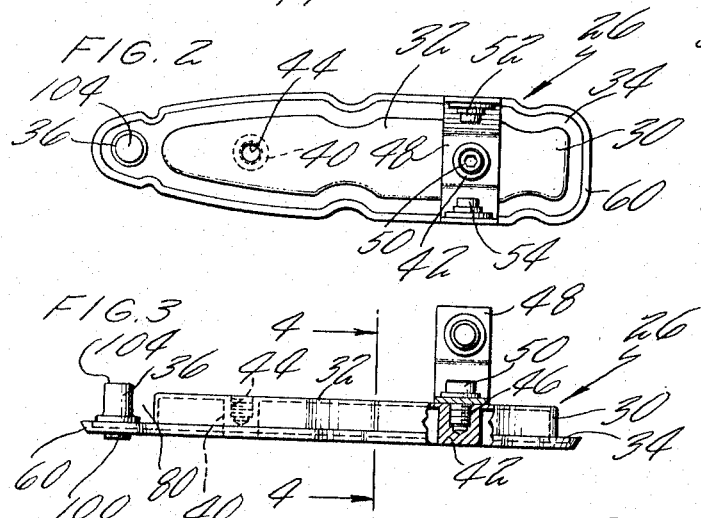
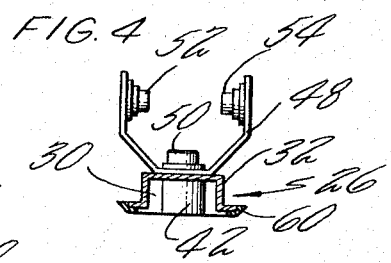
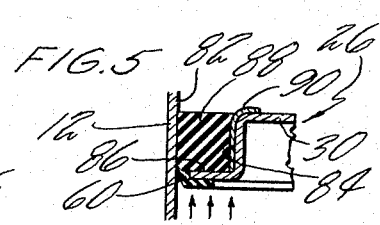
INVENTORS
GEORGE CAPOWICH
PIERCE A. MECK
BY Vernon F. Hauschild
ATTORNEY May 2, 1967  G. CAPOWICH ETAL  3,316,975
HELICOPTER BLADE TIP SEAL
Filed Feb. 25, 1965  2 Sheets-Sheet 2
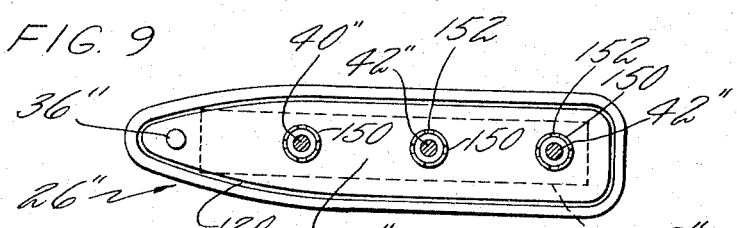
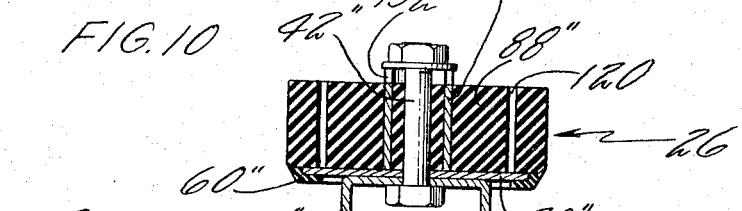
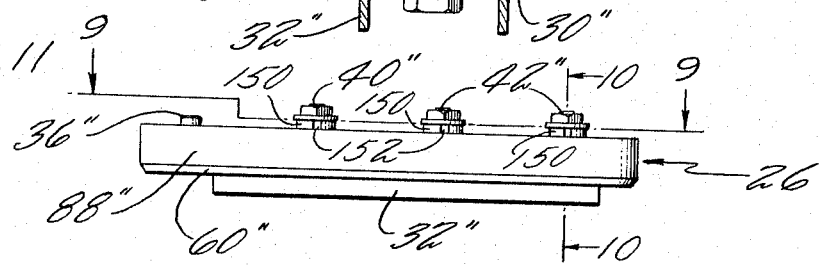
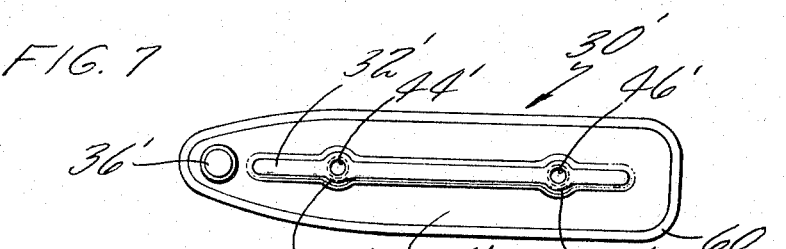
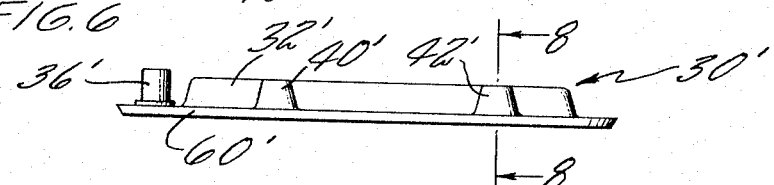
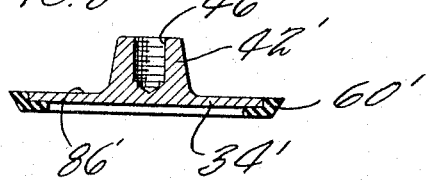
INVENTORS
GEORGE CAPOWICH
PIERCE A. MECK
BY Vernon F. Hauschild
ATTORNEY

United States Patent Office 3,316,975
Patented May 2, 1967

3,316,975
HELICOPTER BLADE TIP SEAL
George Capowich, Shelton, Conn., and Pierce A. Meck, South Salem, N.Y., assignors to United Aircraft Corporation, East Hartford, Conn., a corporation of Delaware
Filed Feb. 25, 1965, Ser. No. 435,213
20 Claims. (Cl. 170—159)

This invention relates to a seal for and a method for sealing the end of a supporting spar of a rotor blade so that it can be pressurized.

To inspect helicopter blades, it has been deemed advisable to pressurize the interior of the helicopter blade hollow spar and use indicators to detect when pressure is being lost, thereby warning that cracks may be occurring in the wall of the spar. Since the spar is the structural, load carrying portion of the blade, its condition is of utmost importance. To be able to pressurize the interior of the spar, it is important to be able to adequately seal off both ends of the spar. Our invention relates to such a seal and is preferably intended for use at the blade tip section.

In the past such blade tip seals have been made and consist of a rubber-like compound sandwiched between spaced plates as taught in U.S. Patents Nos. 3,136,369 and 3,168,144.

The earliest blade-tip seal arrangement was that shown in U.S. Patent No. 3,168,144. This seal consisted of a series of layers of neoprene rubber sandwiched between end plates with load creating through-bolts passing therethrough. This seal did not prove fully satisfactory in operation because the neoprene rubber would break down and lose its sealing qualities when the blade was heated to repair one of the trailing edge pockets. Also, the solid neoprene rubber was not sufficiently flexible to adapt to the contours of the strength beads which project spanwise on the inner surface of the hollow spar as shown in that patent. Thirdly, the through-bolts presented leakage problems. To avoid the contour problems and the reheating problems of this earliest blade tip seal, the construction taught in U.S. Patent No. 3,136,369 was devised. In this construction, an uncured elastomeric compound was compressed between two plates and cured in place. This second type of blade tip seal solved the problem of seal conformation to the spar beads.

While this second type of blade tip seal performed a good sealing function initially, quite unexpectedly, experience showed that the rubber-like material would eventually revert to the liquid state and hence not serve as a seal and that this reversion was accelerated by the application of heat as required to replace blade pockets. After much consideration, study and experiment, it is now believed that this sealing compound decomposition is caused by the entrapment of volatile gases within the sealing compound during curing.

It is accordingly an object of this invention to teach a helicopter blade tip seal from which the volatile gases created during seal curing may escape.

It is still a further object of this invention to teach such a blade tip seal which is light in weight and yet sufficiently sturdy to withstand the centrifugal loading imposed thereon during blade rotation.

It is still a further object of this invention to teach such a blade tip seal having no bolts passing therethrough and which is of solid unit construction or may optionally contain a press-fitted pin.

An object of this invention is to provide a seal and method for sealing a blade which can be used with existing spar members of blades without involving any major change to the blade.

Another object of this invention is to provide a method for sealing the end of a blade spar so that the flight characteristics of the blade will be affected to a minimum.

A further object of this invention is to provide a method of sealing the end of a blade spar to provide for heating of the end sealed without adversely affecting the ability of the seal to maintain a pressure difference thereacross.

A further object of this invention is to provide a method of sealing the tip end of a blade spar so that the interior of the blade can maintain either a pressure or a vacuum.

Another object of this invention is to provide a method for sealing a blade spar in which the sealing dam formed comprises a compound which has been cured to adhere as one piece to parts of the dam and the spar to prevent leakage past the dam.

Another object of this invention is to provide a solid dam member having substantially a "hat" in cross section.

A further object of this invention is to provide a layer or tape to be located around the portion of the "hat" section which is parallel to the inner surface of the spar.

It is still a further object of this invention to teach a dam for use with a helicopter blade tip seal, which dam may be a lightweight casting, possibly of aluminum, a strong forging, possibly of stainless steel or aluminum alloy, or a lightweight fabricated part possibly of Fiberglas with required reinforcing.

These and other objects and advantages will be apparent from the specification and claims and from the accompanying drawings which illustrate an embodiment of the invention.

FIG. 1 is a view of a rotor blade positioned vertically with a section removed.

FIG. 2 is an enlarged view showing the dam as viewed from the outboard end of the blade.

FIG. 3 is a side view of the dam shown in FIGS. 1 and 2.

FIG. 4 is a view taken along the line 4—4 of FIG. 3.

FIG. 5 is an enlarged view of the face of the dam and the seal which contacts the interior of the hollow blade spar.

FIG. 6 is a side view of a dam for use with our helicopter blade tip seal, which dam is a forging.

FIG. 7 is a top view comparable to FIG. 6.

FIG. 8 is a view taken along line 8—8 of FIG. 6.

FIG. 9 is a sectional view of another embodiment of our helicopter blade tip seal taken along line 9—9 of FIG. 11.

FIG. 10 is a cross section view taken along line 10—10 of FIG. 11.

FIG. 11 is a side elevation of the FIGS. 9 and 10 embodiment.

As viewed in FIG. 1, the rotor blade 10 comprises essentially an extruded metal spar 12 which extends from the root section 14 to the tip section 16 of the blade which comprises the main structural member as well as the leading edge portion of the blade. While metal has been mentioned, it is to be understood that other material, such as Fiberglas, can be used. The spar forms a substantial chordwise portion of the blade and conforms to the airfoil contour. The remainder of the chordwise extent of the blade is made of spanwise positioned V-shaped sheet metal pockets or boxes 18, the upper and lower forward edges 20 of which are adhesively bonded by heat application to the upper and lower aft edges 22 of the spar 12. Spar 12 and pockets 18 cooperate to form blade airfoil section 23. Blades of the type described can have a weight, or weights, 24 positioned in the spar for blade balance, guided by spanwise beads on the upper and lower inner surfaces of the ollow spar (not shown). Blades of this type are shown 1 greater particularity in U.S. Patents Nos. 2,754,917 nd 2,754,918, which are hereby incorporated by reference. While a specific blade structure has been described, uch has been done to provide an environment for the blade seal and sealing method which may be used with ther types of blades.

The blade seal and sealing method to be described in his application involve the use of parts which are posiioned in one end of a blade spar in a new and novel nanner to seal the spar at a particular location. The sealing means 26 is formed including the following parts:

(1) Hat shaped dam or plate 30, which is preferably a solid walled impregnated casting or a forging and which includes crown or reinforcing section 32 and rim section 34. Dam 30 has an outer periphery slightly smaller than the inner periphery of spar 12. To avoid porosity, if dam 30 is a casting it should be impregnated with a polyester resin procurable from Wester Sealant Corporation, Norwalk, Connecticut. It will be noted that dam 30 is positioned within the interior of spar 12 to extend parallel to the chord of blade 10. Dam 30 includes boss or pin 36, which extends therethrough in a press fit and cooperates with counterweight 24 and counterweight nose block 38, which is attached to spar 12, securely positioning the forward end of dam 30. If dam 30 is a strong metal such as stainless steel, element 36 is a boss so that dam 30 is a solid unit, while if dam 30 is aluminum, element 36 is a press fit pin to transfer counterweight loads. Dam 30 also includes bosses 40 and 42 which include tapped holes 44 and 46.

(2) U-shaped bracket 48 serves to position the after or rearward end of dam 30. Bolt 50 extends therethrough and is threadably received in bore 46 to securely connect bracket 48 to dam 30. Dam 30 includes allochiral bosses 52 and 54 which are adapted to receive a screw which extends through the wall of spar 12, thereby attaching bracket 48 to spar 12.

(3) Knife-edged neoprene rubber seal 60 extends around the periphery of the rim section 34 of dam 30 and is vulcanized to become permanently bonded to rim section 34. It is an important teaching of this invention that knife-edged seal 60 have its knife-edged portion projecting toward blade tip section 16 so that when dam 30 is placed within the interior of hollow spar 12, the knife edge will project upwardly toward blade tip section 16 and provide a continuous seal between spar 12 and dam 30.

(4) With hat-shaped dam 30 positioned chrodwise within spar 12, an annular cavity 80 is formed between the inner wall 82 of spar 12, and surfaces 84 of crown section and 86 of brim section, together with seal 60. A suitable seal such as an elastomeric sealer which has low permeability is positioned within cavity 80 to form annular seal 88. Seal 88 is preferably poured into cavity 80 in an uncured condition and in a good flow condition by means of a nozzle gun and cured therein so as to become permanently bonded to spar surface 82 and dam surface 86. Annular seal 88 accordingly performs the function of providing a positive seal between dam 30 and spar 12 and cooperates therewith to form sealing means 26.

(5) A release agent 90 such as Teflon or Temp-r-tape manufactured by Conn. Hard Rubber Company is applied to surface 84 of dam crown section 32 to prevent seal 88 from bonding thereagainst. This coating is used so that seal 88 will not tear due to shrinkage but will be able to adhere to surfaces 82 and 86 since it is free to move with respect to the release agent 90 on surface 84.

In assembling dam 30 in spar 12 after pockets 18 have been bonded thereto, the blade 10 is positioned vertically upon its root section 14 with the blade end cap 92 of tip section 16 and nose block 38 removed. This gives free access from vertically above the blade tip section 16 into the hollow interior of spar 12. Counterweights 24 have already been installed. The operator uses two elongated and externally threaded prongs (not shown) which threadably engage the threads 44 and 46 of bosses 40 and 42. The operator then using a continuous inwardly directed movement gradually lowers dam 30 into the interior of hollow spar 12 until it is in its proper position wherein surface 100 of boss 36 bears against counterweights 24. It is important that a continuous inwardly directed motion be used throughout the process of inserting dam 30 into spar 12 to insure that the knife edge of seal 60 is positioned in an outwardly directed fashion as best shown in FIG. 5. If the operator were to pull dam 30 outwardly within spar 12, this could cause all or a portion of the knife edge of seal 60 to bend inwardly and possibly cause leakage therearound. With dam 30 in its properly extending chordwise position, bracket 48 is then attached by bolt 50 to boss 42 and suitable attachment means such as screws are passed through apertures in the walls of spar 12 into allochiral bosses 52 and 54 to secure bracket 48 and hence dam 30 to spar 12. Member 38 or a substitute therefor may now be temporarily inserted to bear against the outer surface 104 of boss 36 so as to position the forward end of dam 30 so that dam 30 is supported at its aft end by bracket 48 and its forward end by boss 36, counterweights 24 and nose block 38. With dam 30 so positioned, seal 88 may be poured into cavity 80 and cured in position in a fashion to be described hereinafter. With the seal so cured and permanently bonded so surfaces 82 and 86, nose block 38 may be permanently placed in position and blade end cap 92 connected to spar 12 and pockets 18 by screws 110.

The process used in applying and curing seal 88 is as follows:

(1) Before dam 30 is placed within the interior of hollow spar 12, the inner surface 82 of spar 12 and the surfaces 86 and 84 of dam 30 are thoroughly cleaned with a suitable solvent degreaser such as methyl-ethyl-ketone;

(2) A release agent 90 such as Teflon or Temp-r-tape is then applied to the full periphery of surface 84 of dam 30;

(3) Surface 82 of spar 12 and the surfaces of seal 60 and the surface 86 of dam 30 then have a coating of primer such as EC–1945 B/A, manufactured by the Minnesota Mining and Manufacturing Company, applied thereto. Primer 1945 B/A is thoroughly mixed of equal parts by volume of accelerator and base.

(4) The primer is permitted to cure for one hour by air drying.

(5) A second coat of this primer is then applied to the same surfaces as described above.

(6) The primer is cured for four hours at 75±5° F. or thirty minutes at room temperature plus 160°±10° F. or other appropriate curing.

(7) Dam 30 is then inserted into spar 12 as described above and clamped in position by bracket 48 and if blade 10 is not already vertical it should be made vertical at this time.

(8) By a heat blanket or other appropriate means, spar section 12 in the vicinity of dam 30 is heated to 120° F. ±10° F. for five minutes.

(9) While spar 12 remains so heated, an appropriate elastomeric sealant in good flowing condition such as EC–2181 B/A, manufactured by the Minnesota Mining and Manufacturing Company, is then applied so as to substantially fill cavity 80 formed between spar 12 and dam 30. EC–2181 B/A is mixed fourteen parts of accelerator to one hundred parts of base by weight.

(10) While retaining the spar temperature at about 120° F., the sealant is permitted to settle for about ten minutes to permit the escape of occluded air.

(11) If nose block 38 or an appropriate substitute therefor is not already in position, it should be placed in position at this time.

(12) Cure elastomeric sealant EC-2181 at 350° F. for one hour minimum to a durometer of A45. Inasmuch as the blade temperature will be measured rather than sealant temperature, a two and a half hour period will be required at a temperature of 345° F. to 370° F.

Referring to FIGS. 6-8 we see an embodiment of a dam 30′ which is a forging and preferably made of stainless steel for strength and corrosion resistance purposes or aluminum alloy for lightness. Dam 30′ is hat-shaped and includes rim section 34′ and crown section or reinforcing web 32′. Peripheral knife-edge seal 60′ extends about the periphery of rim section 34′ as in the FIG. 1-5 construction. Bosses 40′ and 42′ project from rim portion 34′ and may include tapped holes such as 44′ and 46′ to receive either attachment means such as bracket 48 of FIGS. 2-4 or positioning means (not shown) to be used by the operator when positioning dam 30′ into spar 12 to permit the pouring of the uncured sealant therearound for eventual curing between the interior surface of spar 12 and surface 86′ of rim portion 34′. A release agent such as element 90 of FIG. 5 would be applied to crown portion 32′ and bosses 40′ and 42′ to prevent adhesion of the sealed material thereagainst as previously described. Boss 36′ is preferably an integral part of the forging shown in FIGS. 6-8 and may serve to position dam 30′ between counterweight 4 and counterweight block 28 (FIG. 1). It will be noted that the forging construction shown in FIGS. 6-8 is a one piece, solid unit.

Another embodiment of our helicopter blade tip seal is shown in FIGS. 9-11 wherein element 26″ represents the sealing means and dam 30″ is a flat plate with crown position or reinforcing element 32″ being of U-shaped cross section and attached to plate 30″ by any appropriate means such as bonding. Element 32″ serves to reinforce or strengthen flat plate 30″. Peripheral edge seal 60″ is attached to the outer periphery of plate 30″. Bolts 40″ and 42″ project from plate 30″ and serve the same function as similarly numbered bosses as in FIGS. 1-5 and 6-8 construction. Vented bushings 150 are coated with a release agent to serve the same purpose as element 90 of FIG. 5 and contain vent holes 152 to permit the release of volatile gases during curing of the seal compound. In the FIGS. 9-11 construction after plate 30″ is lowered into the interior of spar 12 and positioned into proper position the uncured sealant is then poured as described previously into the spar 12 on top of plate 30″ and seal 60″ to a preselected height. An airfoil shaped cooky cutter properly treated with release agent is then inserted into the sealant and a suitable release agent also surrounds bosses 40″ and 42″. After the uncured sealant has been cured and permanently bonded to plate 30″ and the interior wall of spar 12 as previously described, the airfoil shaped cooky cutter is removed to leave airfoil shaped groove or slot 120 in seal 88″. Slot 120 provides shrinkage relief within seal 88″ and permits the seal to remain permanently bonded to surface 82 of spar 12 and plate 30″ even though shrinkage occurs in seal 88″. It will be noted that this shrinkage is absorbed in change of dimension in slot 120.

In testing the aluminum spar just referred to having a dam 30 therein for seal efficiency, a mixture of air and Freon was used and as stated hereinbefore, the dam had been formed using EC-2181 B/A which had the primer EC-1945 B/A applied first. It is to be understood that the root end of the spar is sealed, for example as shown in U.S. Patent No. 3,168,144, so that the tip end sealing means 26 forms a sealed chamber therewith. A mixture of air and Freon was placed in the spar under a total pressure of approximately 25 p.s.i. and a leak detector was used to check the dam. Since Freon is corrosive to aluminum dry nitrogen has been used to pressurize aluminum spars of blades for long periods of time. For blades which have been made having an extruded aluminum spar, a pressure of approximately 10 p.s.i. has been used for regular flight. To rid the blade of Freon, the blade is evacuated of Freon with a vacuum pump and the blade interior is filled with nitrogen and purged three times before nitrogen is finally added permanently.

It is to be understood that the invention is not limited to the specific embodiment herein illustrated and described but may be used in other ways without departure from its spirit as defined by the following claims.

We claim:

1. A helicopter blade having a root section, a tip section and an airfoil section therebetween, said blade comprising a hollow spar extending spanwise of the blade between the blade tip and root sections and which is shaped to form the forward portion of the airfoil section, a plurality of spanwise arranged blade pockets attached to said spar and shaped to cooperate therewith in forming said blade airfoil section, a spar seal located within the interior of said hollow spar and comprising a dam including a rim portion extending parallel to the blade chord and fitting snugly into the spar interior, means to support said dam in said spar, sealing means permanently bonded to said dam rim portion and the interior of said hollow spar throughout the full periphery thereof to form a gas tight seal between said hollow spar and said dam.

2. Apparatus according to claim 1 and including a centrally located reinforcing member attached to said dam, a rubber-like seal attached to and extending around the periphery of said dam rim portion and including a knife-edge engaging the inner wall of said hollow spar throughout the full periphery thereof and with said knife edge bent toward said blade tip section.

3. A helicopter blade having a root section, a tip section and an airfoil section therebetween, said blade including a hollow spar extending spanwise of the blade between the blade tip and root sections, a spar tip seal located within the interior of said hollow spar adjacent said tip section and comprising a hat-shaped dam including a crown portion projecting toward said blade tip section and a rim portion extending parallel to the blade chord to form an annular cavity between said spar and said dam, means to support the forward end of said dam in said spar, means to support the after end of said dam in said spar, sealing means surrounding said dam crown portion and permanently bonded to said dam rim portion and the interior of said hollow spar throughout the full periphery thereof to form a gas tight seal between said hollow spar and said dam.

4. A helicopter blade having a root section, a tip section and an airfoil section therebetween, said blade including a hollow spar extending spanwise of the blade between the blade tip and root sections, a spar tip seal located within the interior of said hollow spar adjacent said tip section and comprising a hat-shaped dam including a crown portion projecting toward said blade tip section and a rim portion extending parallel to the blade chord to form an annular cavity between said spar and said dam, a release agent attached to the outer periphery of said dam rim portion, insertion means attached to said dam to permit said dam to be inserted into said spar, means to support the forward end of said dam in said spar including counterweights to balance said blade, means to support the after end of said dam in said spar, sealing means surrounding said dam crown portion and permanently bonded to said dam rim portion and the interior of said hollow spar throughout the full periphery thereof to form a gas tight seal between said hollow spar and said dam.

5. A method of sealing one end of a hollow spar for a helicopter rotor blade comprising:
 (a) selecting a hat-shaped dam for the tip end of the spar having an outside contour slightly less than the inside contour of the spar;
 (b) vulcanizing a knife-edged neoprene rubber bead around the entire edge of the dam of a thickness greater than the difference between the inside contour of the spar and the outside contour of the dam so that the dam and the bead will have a snug fit in the spar;

(c) thoroughly cleaning the inner surface of the spar and the surfaces of the dam;

(d) placing a layer of release agent around the periphery of the substantially vertically extending surface of the dam;

(e) placing a coating of EC-1945 B/A primer mixed thoroughly of equal parts by volume of accelerator and base to the inner surface of the spar and the surfaces of the dam;

(f) curing the primed spar and dam for about one hour of air drying;

(g) applying a second coat of the aforementioned EC-1945 primer to the interior surface of the spar and to the surfaces of the dam;

(h) curing the primer in the spar and dam;

(i) inserting the dam into the spar interior at a predetermined location keeping it parallel to the chord line of the spar and using an inward motion throughout so that the knife edge of the bead will be bent toward the blade tip throughout its full periphery and so that the dam and the spar form an annular cavity therebetween;

(j) securing the after end of the dam to the spar;

(k) heating the spar section adjacent the dam to approximately 120° F. ±10° F. for five minutes;

(l) placing an uncured sealing compound EC-2181 B/A thoroughly mixed of fourteen parts of accelerator and one hundred parts of base by weight in the spar to substantially fill the annular cavity;

(m) permitting the uncured sealant to settle out for approximately ten minutes to permit the escape of occluded air therefrom;

(n) securing the forward end of the dam in the spar;

(o) curing the uncured compound EC-2181 B/A for about two and a half hours, at a blade temperature of 345° to 370° F., to a durometer of A45.

6. A method of sealing one end of a hollow spar for a helicopter rotor blade comprising the steps of:

(a) inserting a plate into said spar having an outer edge which snugly engages said spar;

(b) placing a predetermined amount of uncured sealing compound into said blade end; and (c) curing the compound between said spar and plate.

7. A method of sealing one end of a hollow spar for a helicopter rotor blade comprising the steps of:

(a) inserting a dam into said spar having an outer edge which snugly engages said spar;

(b) preparing the surface of the dam and the area of the spar adjacent thereto to receive an uncured sealing compound;

(c) placing a predetermined amount of uncured sealing compound into the spar end; and (d) curing the compound between said spar and dam.

8. A method of sealing one end of a hollow spar for a helicopter rotor blade comprising the steps of:

(a) inserting a dam into said spar having an outer edge which snugly engages said spar;

(b) heating the area of the spar which is to receive the uncured sealing compound;

(c) placing a predetermined amount of uncured sealing compound into the spar end; and (d) curing the compound between said dam and spar.

9. A method of sealing one end of a hollow spar for a helicopter rotor blade comprising the steps of:

(a) inserting a dam into said spar having an outer edge which snugly engages said spar;

(b) heating the area of the spar which is to receive the uncured sealing compound;

(c) placing a predetermined amount of uncured sealing compound into said blade end;

(d) letting compound set to permit entrapped air to escape; and (e) curing the compound between said dam and spar.

10. A method of sealing one end of a hollow spar for a helicopter rotor blade comprising the steps of:

(a) selecting a dam for said spar having an outer edge which will snugly engage said spar;

(b) cleaning the dam and spar surface where the seal is to be located;

(c) placing said dam in said spar in its proper location;

(d) placing a predetermined amount of uncured sealing compound into said blade end;

(e) heating the area of the spar around the compound; and (f) curing the compound between said dam and spar.

11. A method of sealing one end of a hollow spar for a helicopter rotor blade comprising:

(a) selecting a dam for the tip end of the spar having an outside contour slightly less than the inside contour of the spar;

(b) fixing a bead of material around the entire edge of said dam of a thickness greater than the difference between the inside contour of the spar and the outside contour of the dam;

(c) cleaning the spar cavity around the area to be sealed and the dam to receive a sealing compound;

(d) placing the dam in the spar keeping it parallel to a chord line of said spar;

(e) placing an uncured sealing compound in said spar; and (f) curing said compound.

12. A method of sealing one end of a hollow spar for a helicopter rotor blade comprising:

(a) selecting a dam for the tip end of the spar having an outside contour slightly less than the inside contour of the spar;

(b) fixing a bead of material around the entire edge of said dam of a thickness greater than the difference between the inside contour of the spar and the outside contour of the dam;

(c) cleaning the spar cavity around the area to be sealed and the dam to receive a sealing compound;

(d) placing the dam in the spar keeping it parallel to a chord line of said spar;

(e) placing an uncured sealing compound in said spar;

(f) heating said spar around said compound so that the compound can be easily worked;

(g) curing said compound.

13. A method of sealing one end of a hollow spar for a helicopter rotor blade comprising:

(a) selecting a dam for the tip end of the spar having an outside contour slightly less than the inside contour of the spar;

(b) fixing a bead of material around the entire edge of said dam of a thickness greater than the difference between the inside contour of the spar and the outside contour of the dam so that the dam and bead will have a snug fit with said spar;

(c) placing the dam in the spar at a predetermined location keeping it parallel to a chordline of said spar;

(d) cleaning the spar cavity around the area to be sealed and the dam to receive a sealing compound;

(e) placing an uncured sealing compound in said spar;

(f) permitting any air trapped in said compound to escape; and (g) curing said compound.

14. A method of sealing one end of a hollow spar for a helicopter rotor blade comprising the steps of:

(a) inserting a dam into said spar having an outer edge which snugly engages said spar;

(b) placing a predetermined amount of uncured sealing compound into said blade end; and (c) curing the compound between said dam and spar.

15. A method of sealing one end of a hollow spar for a helicopter rotor blade comprising:

(a) selecting a hat-shaped dam for the interior of the spar having an outside contour slightly less than the inside contour of the spar;
(b) fixing a bead of elastomeric material around the entire edge of said dam of a thickness greater than the difference between the inside contour of the spar and the outside contour of the dam;
(c) coating the spar cavity around the area to be sealed and the dam with a primer to receive a sealing compound;
(d) drying said primer;
(e) placing the dam in the spar keeping it parallel to a chordline of said spar;
(f) placing an uncured sealing compound in said spar; and
(g) curing said compound.

16. A method of sealing one end of a hollow spar for a helicopter rotor blade comprising:
(a) selecting a hat-shaped dam for the interior of the spar having an outside contour slightly less than the inside contour of the spar;
(b) fixing a knife edged bead of elastomeric material around the entire edge of said dam of a thickness greater than the difference between the inside contour of the spar and the outside contour of the dam;
(c) coating the spar cavity around the area to be sealed and the dam with a primer to receive a sealing compound;
(d) drying said primer;
(e) placing the dam in the spar keeping it parallel to a chordline of said spar;
(f) placing an uncured sealing compound EC-2181 B/A in said spar; and
(g) curing said compound until it has a durometer reading of approximately 45.

17. A method of sealing one end of a hollow spar for a helicopter rotor blade comprising:
(a) selecting a hat-shaped dam for the tip end of the spar having an outside contour slightly less than the inside contour of the spar;
(b) fixing a knife edged bead of resilient material around the entire edge of said dam of a thickness greater than the difference between the inside contour of the spar and the outside contour of the spar and outside contour of the dam;
(c) coating the spar cavity around the area to be sealed and the dam to receive a sealing compound with a primer EC-1945 B/A;
(d) locating the dam in the spar keeping it parallel to a chordline of said spar;
(e) placing an uncured sealing compound EC-2181 B/A in said spar;
(f) heating said spar around said compound so that the compound can be easily worked;
(g) curing said compound.

18. A method of sealing one end of a hollow spar for a helicopter rotor blade comprising:
(a) selecting a hat-shaped dam for the interior of the spar having a knife edged bead of resilient material around the entire edge so that the bead is snugly fit against the spar when inserted;
(b) coating the spar cavity around the area to be sealed and the dam with a two part primer having a base and an accelerator to receive a sealing compound;
(c) curing said primer;
(d) positioning the dam in the spar keeping it parallel to a chordline of said spar so that the knife edge of the bead bends uniformly toward the blade tip and so that an annular cavity is formed between the spar and the dam;
(e) placing an uncured two part sealing compound having a base and an accelerator to substantially fill the annular cavity; and
(f) curing said compound to obtain the proper strength to withstand an operating pressure against the dam.

19. The method of fabricating a helicopter blade comprising providing a hollow spar member forming the leading airfoil section of the blade, sealing opposite ends of the spar member using a seal at one end which is permanently bonded to the spar and a dam by heat curing, then thermally bonding airfoil shaped pockets to the spar adjacent the seal to complete the airfoil shape of the spar.

20. A helicopter blade including a hollow spar extending spanwise of the blade, a spar end seal located within the interior of the hollow spar and comprising a dam member positioned chordwise within the blade, which dam has an outer periphery which forms a slight clearance with the inner wall of the spar, a knife-edged peripheral seal extending between the dam periphery and the spar inner wall, a reinforcing member centrally located with respect to and attached to the dam, means to support said dam in fixed position within said spar, and a seal of low permeability permanently bonded to the spar inner wall and the dam and including a relief slot extending about the periphery thereof.

No references cited.

MARTIN P. SCHWADRON, *Primary Examiner.*

E. A. POWELL, JR., *Assistant Examiner.*